United States Patent [19]
Cohn et al.

[11] 4,330,761
[45] May 18, 1982

[54] HIGH POWER GAS LASER

[75] Inventors: Daniel R. Cohn, Boston; Benjamin Lax, Chestnut Hill; Kenneth J. Button, Belmont, all of Mass.

[73] Assignee: Massachusetts Institute of Technology, Cambridge, Mass.

[21] Appl. No.: 700,657

[22] Filed: Jun. 28, 1976

[51] Int. Cl.³ .............................................. H01S 3/091
[52] U.S. Cl. .......................................... 372/4; 372/59
[58] Field of Search ..................... 331/94.5 G, 94.5 P, 331/94.5 C, 94.5 D, 94.5 E, 94.5 F; 330/4.3; 307/88.3

[56] References Cited
U.S. PATENT DOCUMENTS 3,515,897  6/1970  Culver ............................ 331/94.5 C
3,983,406  9/1976  Lax et al. ........................... 307/88.3

OTHER PUBLICATIONS

Chang et al., *Applied Physics Letters*, vol. 17, No. 6, Sep. 15, 1970, pp. 249–251.
Evans et al., *Applied Physics Letters*, vol. 26, No. 11, Jun. 1, 1975, pp. 630–632.
Radford, *IEEE Journal of Quantum Electronics*, vol. QE-11, No. 5, May 1975, pp. 213–214.
Ulrich et al., *Applied Optics*, vol. 9, No. 11, Nov. 1970, pp. 2511–2516.

*Primary Examiner*—William L. Sikes
*Attorney, Agent, or Firm*—Arthur A. Smith, Jr.; Mark G. Lappin

[57] ABSTRACT

A gas laser adapted to produce laser radiation in the far infrared region of the electromagnetic spectrum, but adapted, as well, to produce radiation in the infrared, the near infrared, the millimeter and the microwave regions. The laser employs a zig-zag pumping scheme which serves to excite the gas uniformly and thus enhance transfer of pump energy into laser energy.

9 Claims, 3 Drawing Figures

HIGH POWER GAS LASER

The present invention relates to gas lasers.

Information by way of background and amplification is contained in a journal article "Submillimeter Laser Wavelength Tables" (Rosenbluh et al). Applied Optics, Vol. 15, pp. 2635-2644, November 1976, that is hereby incorporated herein by reference; see also a journal article entitled "Development of an efficient 9-kW 496-$\mu$m $CH_3F$ laser oscillator" (Cohn et al). Applied Physics Letters, Vol. 27, No. 5, (September 1975, pp 280-282; see also U.S. Pat. No. 3,983,406 (Lax et al).

There is a continuing need for lasers that generate radiation in the far infrared (i.e., 100-1000 $\mu$m) region of the electromagnetic spectrum and at power levels that can be used, say, in photochemical operations just now beginning to assume great importance. The need exists, also, for high power lasers in the near infrared (i.e., 1–10 $\mu$m), the infrared (10–100 $\mu$m), and the microwave (i.e., 10 mm to 10 cm) regions of the spectrum. In addition, flexibility in such laser is a desired feature, that is, a laser which can be made to produce more than one output frequency by easy and quick changes is a valuable tool in industry, and particularly the electrochemical industry.

It is an object of the present invention to provide a gas laser that produces radiation in the microwave, millimeter, far infrared, infrared, and near infrared regions of the electromagnetic spectrum, the particular radiation produced being a function of the particular gas in the laser.

Another object is to provide a gas laser which permits facile changing of the gas to give output radiation at any number of different wavelengths merely by removing one gas and replacing it with another and changing the pump frequency when needed.

Still another object is to provide more efficient pumping of the gas in said laser than heretofore whereby the gas is illuminated uniformly and completely.

These and still further object are addressed hereinafter.

The foregoing objects are achieved in a high-power, gas laser that includes an elongate chamber containing a molecular gas with rotational quantum levels whose energy spacing lies in either the microwave, the millimeter, the submillimeter or the infrared region of the electromagnetic spectrum. High-power laser pump means is provided to effect inversion of the energy levels of said gas, laser radiation of the pump means being directed at an acute angle to the axis of the chamber. Two facing plane mirrored surfaces within the chamber serve to reflect the pump beam along a zig-zag path through the gas to effect substantially complete and uniform illumination of the gas. The path along which the pump radiation propagates has a transverse component laterally between the two reflecting surfaces and a longitudinal component. Mirror means forms a cavity which results in narrow linewidth, laser radiation that emits from the cavity in either the microwave, the millimeter, the submillimeter or the infrared region of the spectrum, depending on the gas used. The length of the cavity is about equal to the absorption length of the pump laser radiation in said gas at the particular pressure of that gas (e.g., typically 0.5 to 2 Torr).

The invention is hereinafter discussed with reference to the accompanying drawing in which.

Figure 1:
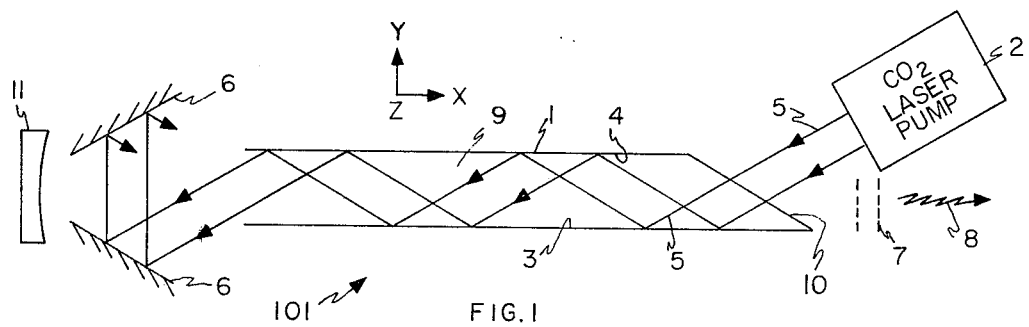
FIG. 1 is a side view, schematic in form, of a gas laser embodying the present teaching.

Some preliminary and general remarks are in order. The main thrust of the present invention is at providing high-power, coherent radiation in the far infrared or submillimeter (i.e., 100 to 1000 $\mu$m) region of the electromagnetic spectrum. The concepts disclosed herein, however, permit generation of such high power coherent radiation in the range of from, say 1 cm to 1 mm; it should be noted though that, particularly at the lower frequencies, quantum efficiencies drop off somewhat drastically. Nevertheless, the underlying ideas here are useful in said range and beyond.

The present inventors have found that high-power laser radiation in the far infrared or submillimeter region of the electromagnetic spectrum can be obtained from a gas laser by a scheme which effects much greater conversion efficiency of energy from a high-power laser pump beam and the gas. More precisely, the inventors have found that an optimal geometry can be found for the geometrical relationship between the pump beam of the laser and the optical cavity within which the gas is disposed; in particular, the inventors have found that the pump beam can be directed back and forth within the cavity in multiple traversals of the cavity in such a way that substantially all the gas within the cavity is illuminated completely and uniformly. The embodiment discussed in greatest detail herein is one in which the cavity is elongate; the gas is molecular with rotational quantum levels whose energy spacing lies in the far infrared or the submillimeter region of the electromagnetic spectrum; planar mirrored side surfaces oriented parallel to the longitudinal axis of the cavity and facing each other receive the pump beam which is oriented at an acute angle to the surfaces and is directed upon one surface, being reflected therefrom to the other, back to the first, and so on, along a zig-zag path that has a longitudinal component.

The pump of greatest interest is the $CO_2$ laser and it is operated in a pulse mode; the gases of greatest interest, as above noted, are those having vibrational-rotational energy spacing in the far infrared or submillimeter region of the spectrum. Other high-power pump lasers may be used if they can be tuned to emit radiation of a particular wavelength needed for excitation of various molecular gases.

The introduction of the pumping radiation in the zig-zag fashion has three unique advantages over existing pulsed submillimeter laser schemes: (1) The submillimeter molecular gas being pumped (excited) is illuminated uniformly and completely; (2) a submillimeter molecule gas that emits entirely different wavelengths (and requires a different pumping wavelength), may be substituted and the laser then operates on the new wavelength within a few minutes without requiring the time-consuming and expensive change of any other component in the entire system; and (3) various tunable lasers may be substituted for the $CO_2$ laser to pump (excite) various submillimeter molecular gaps.

An explanation as to the advantages just noted is contained in this paragraph. First, optically pumped submillimeter lasers that are now widely used require that the pumping radiation from the $CO_2$ laser be focused in order to pass through a small hole in the elongate chamber containing the submillimeter molecular gas. The pumping radiation then diverges from the focal point within the chamber so that there is intense pumping radiation near the focal point and diffuse, weak intensity, pumping radiation far from the focal point. Some of the gas near the focal point is not illuminated at all by the pumping radiation. In the case of zig-zag pumping of the present invention, however, a collimated $CO_2$ (or other) laser pumping beam is introduced which has a uniform intensity over the cross section of the beam and the cross section of the beam retains its same dimensions as it passes through the elongate chamber containing the submillimeter molecular gas. Moreover, the mirrors within the elongate chamber direct the collimated pump beam so as to illuminate all of the molecular gas uniformly and completely. Although it is conceivable that advantage (1) can be accomplished by using an optical etalon or some other optical device (instead of a small hole) at the point of entry of the pumping radiation into the elongate chamber, these optical devices can only be effective at one wavelength (or an integral or fractional multiple of that one fundamental wavelength). If one wished to change the submillimeter molecular gas in order to obtain output at any one of several hundred other wavelengths, the optical elements would have to be changed. The optical elements themselves are extremely expensive and the process of changing them involves dismantling the elongate chamber. Furthermore, the start-up time would involve several hours of alignment, air evacuation from the chamber and warm-up time for the $CO_2$ laser. The problems encountered in changing gases in prior art systems are found also when the optical pump laser is changed; the present system, on the other hand, permits the facile interchanging of both the gas in the optical cavity and the pump without extensive and time consuming exercises.

In the description that follows, heavy reliance is placed upon the Cohn et al journal article (which may be referred to for further technical aspects that are more properly the subject matter of a technical journal article) and to the Rosenbluh et al journal article (which may be used to amplify on this specification, particularly with regard to the background literature therein cited).

Turning now to FIG. 1, the high-power gas laser shown at 101 is adapted to emit laser radiation in the microwave, the millimeter, the submillimeter or far infrared, the infrared or the near infrared region of the electromagnetic spectrum, depending on the gas employed. The apparatus 101 comprises an elongate chamber 1 containing a molecular gas with rotational quantum levels whose energy spacing lies in the microwave, the millimeter, or the infrared region of the electromagnetic spectrum. Laser pump means 2 is positioned to direct laser radiation 5 at an acute angle to the longitudinal axis (i.e., ±x-direction) of the chamber 1. In this part of the explanation, the pump means is a $CO_2$ laser that lases at 10.6 and 9.6 microns. The gas in the chamber 1 is methyl fluoride ($CH_3F$) at pressures between 0.2 and 5 Torr, and, as is shown in the journal article, the gas pressure for optimum results is about 1.7 Torr. The chamber 1 has two facing, parallel, planar mirrored surfaces 3 and 4 operatively disposed to reflect the pump laser beam 5 transversely (i.e., back and forth between the mirrored side surfaces) along a zig-zag path having a longitudinal component; that is, the beam 5 is reflected along a path that has a transverse or y-component and a longitudinal or x-component. The laser pump 2 is oriented in such a way as to direct the pump beam 5 such that the path of the beam, back and forth along a zig-zag path between the mirrored surfaces within the cavity, is appropriate to subject substantially all the gas in the chamber to pump radiation and effect substantially uniform and complete illumination thereof. A curved rear mirror 11 and a double-mesh front mirror 7 act in combination to form a resonant cavity 9 which results in narrow linewidth radiation 8 in the far-infrared or the submillimeter region, that emits from the cavity, the emitted radiation is the exemplary embodiment being at 496 μm. The length of the cavity is about equal to the absorptive length of the $CO_2$ laser radiation in the $CH_3F$ gas at the particular gas pressure used (i.e., ~1.7 Torr). Some further matters now follow.

The work reported in the Cohn et al journal article, as previously stated herein, is with respect to a 496 μm $CH_3F$ cavity laser; the laser 101 is characterized by an average power of 9 kW and a predominant single longitudinal mode operation with a linewidth of 28 MHz. The power conversion efficiency of the laser ($CH_3F$ power out/$CO_2$ pump power in) is the order of $1.5 \times 10^{-3}$ which is to be compared with efficiency of $10^{-4}$ to $10^{-3}$ previously obtained and at much lower power out.

Figure 3:
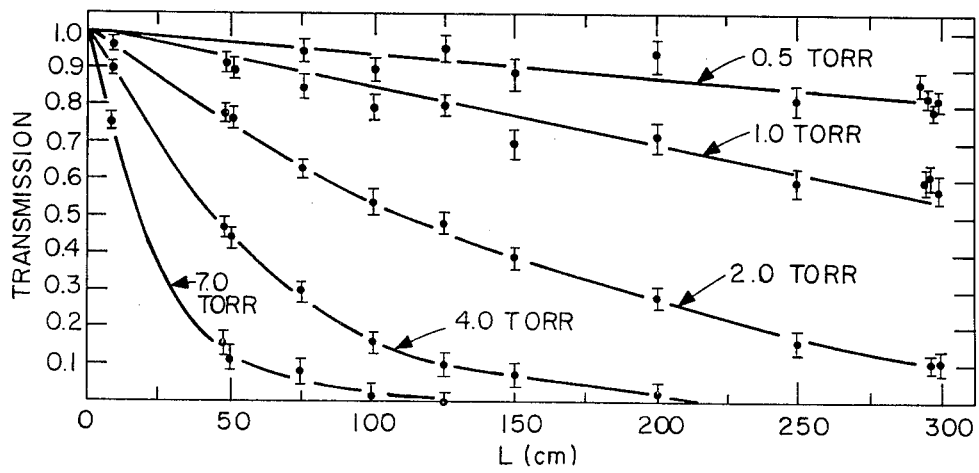
FIG. 3 is a plot of transmission of 9.6 $\mu$m pumping energy through $CH_3F$ gas as a function of distance, L, and with gas pressure as a parameter.

In order that the conversion of the $CO_2$ laser radiation to submillimeter or far infrared laser radiation be efficient, it is necessary that a high degree of absorption of the $CO_2$ radiation by the $CH_3F$ gas occur. In order to satisfy this requirement, measurements shown in FIG. 3 were made of saturated absorption of 9.55 μm P(20)$CO_2$ laser radiation in $CH_3F$ and the volume of the $CH_3F$ gas used in the laser was made to be just sufficient to absorb approximately all of the energy contained in the main (100-ns-long) pulse of the $CO_2$ beam at the anticipated optimum operating pressure of two Torr. The optical cavity 9 of the far-infrared laser for the present system is was designed so as to provide dominant single-mode operation, a plane wave front in the output beam, and optimum coupling of $CH_3F$ radiation from the laser cavity. The cavity 9 between the rear curved mirror 11 and the double-mesh output coupler front mirror 7 was helpful in satisfying these requirements. The distance between the 2.28-m-radius-of-curvature rear mirror 11 and the front mirror 7 of the laser cavity 9 was 1.85 m. A sheet 12 of polyethylene served as a vacuum window in the front of the laser. The length of the $CH_3F$ medium pumped by the $CO_2$ laser radiation was about one m. Excitation of the volume of the $CH_3F$ gas between the mirrors was accomplished by reflecting the $CO_2$ laser radiation between the long planar gold-plated mirrored walls 3 and 4 in the zig-zag path shown. The $CO_2$ laser pump beam 5 was about three cm in diameter. The $CO_2$ laser radiation entered through an NaCL window 10 and impinged upon the gold mirror at angle θ of 60°. A reflector 6 at the far end served to return the $CO_2$ laser radiation back down the cavity making it possible to illuminate, uniformly, almost the entire volume between the long gold mirrors 3 and 4, in two passes. To complete the explanation of the system in FIG. 1, the elements 1, 6, 7, and so forth, as shown, are disposed within a vacuum container 16 (a glass tube in actual apparatus); a vacuum is established by a vacuum pump 13; gas is supplied by a gas supply 14; and the mirrors 7 and 11 are adjusted by mirror adjustment means 15.

The calculated diameter 2w of the fundamental mode for the laser cavity at the 1/e point of the front mirror 7 is 2.4 cm. The gold "lightguide" mirrors 3 and 4 used to guide the $CO_2$ laser radiation down the cavity were placed 5.8 cm apart, a distance which is larger than 4w to permit the $TEM_{OO}$ mode to pass through and out of the laser cavity.

The volume of methyl fluoride gas which is pumped by the $CO_2$ laser radiation is about 1600 $cm^3$. This volume is sufficient to absorb about 0.6 J of $CO_2$ pump radiation at a pressure of 2 Torr. This amount of energy is equal to the energy contained in the main (100-ns-long) pumping pulse of the $CO_2$ laser.

Figure 2:
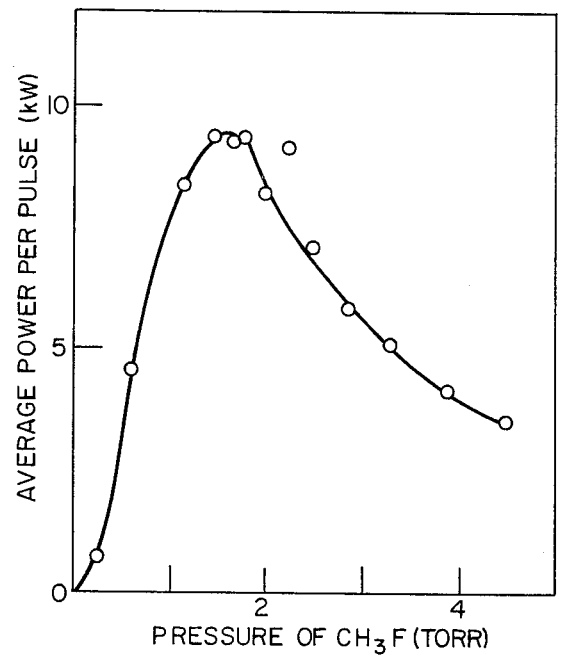
FIG. 2 is a graph of laser output power as a function of gas pressure within the laser cavity for a gas laser in which the gas is $CH_3F$ and shows that a pressure of about two Torr provides highest efficiency.

The pressure dependence of the submillimeter output is shown in FIG. 2. It can be seen that the peak average power occurs at a pressure of about 1.7 Torr. This behavior is similar to that observed in a 4-kW super-radiant $CH_3F$ laser and can be explained in terms of the competition between stimulated emission and rotational relaxation.

The average energy in the submillimeter laser pulse in said work was measured with a slow response time (30-s) thermopile power meter. The shape of the submillimeter pulse was obtained using a pyroelectric detector and a Schottky barrier diode detector. At 1.7 Torr the energy of the submillimeter pulse was $5.6 \times 10^{-4}$ J. The full width half-maximum of the pulse was approximately 60 ns, yielding an average power in the pulse of 9.3 kW. The average $CO_2$ pumping power of the 100-ns gain-switched peak in the $CO_2$ pulse was about 6 MW, giving a power conversion efficiency of about 0.1%, or 10% of the maximum theoretical efficiency. The initiation of the 60-ns $CH_3F$ pulse was delayed about forty ns relative to the initiation of the $CO_2$ pulse.

The relative intensity of the submillimeter radiation in both the vertical and horizontal directions was measured with a pyroelectric detector placed 32 cm in front of the output mesh. The full width of the Gaussian-like spatial dependence of the relative intensity of the submillimeter radiation in the horizontal direction at the 1/e E-field ($1/e^2$ power) point was found to be 4.4 cm. In the vertical direction this value was found to be 2.6 cm. These values indicate that the beam size is determined by the gain medium cross-sectional dimensions. The divergence half-angle of the submillimeter beam was measured to be on the order of 1.1° which is slightly more than the 0.75° angle expected from beam defraction from a plane parallel wave front.

A scanning Fabry-Perot interferometer, with 250 lines per inch, mesh mirrors, was used to measure the wavelength, the number of modes, and the linewidth of the $CH_3F$ radiation. A mesh spacing of fifty cm giving a free spectral range of 300 MHz and a resolution of about 20 MHz was used. As expected, the wavelength of the $CH_3F$ radiation was found to be 496 $\mu$m. It was found that at pressures up to about 2.5 Torr a strongly dominant single longitudinal mode was observed over a significant fraction of the free spectral range of the laser cavity. Two modes of much lower intensity were observed. The separation of the modes that were observed was measured to be about 80 MHz which is that expected from a laser cavity 1.85 m in length. The Fabry-Perot measurement shows a strongly dominant single longitudinal mode operation of the $CH_3F$ laser at 1.8 Torr. The full width at half-maximum of this mode was about 28 MHz. The inventors have carried on further work in methyl fluoride systems, as further discussed in the next paragraph.

In the later work the inventors employed a scaled up version of the original methyl fluoride oscillator-amplifier system to provide 496 $\mu$m submillimeter radiation at a power output of 200 kilowatts (peak)—more than an order of magnitude higher than that achieved previously and the required quality of the output beam has been preserved. In the later system, the $CH_3F$ gas was excited by using 28 joules (250 MW) of 9.6 micrometer radiation from the grating-controlled P(20) line emitted from a Lumonics laser-amplifier system. About 20% of this pumping power is used in the $CH_3F$ oscillator; the remainder is used in the $CH_3F$ amplifier. The methyl fluoride oscillator emits a 60 nsec pulse of 30 kW. The use of a mesh output coupler and other design features produce a predominantly single-mode output with such low beam divergence that the beam is found to be collimated as far as ten feet away. The pulse width is 40 MHz which is well within the narrow range required for Thomson scattering from ion plasmas. It can be narrowed more by suppressing transverse modes. Subsidiary peaks of a higher mode still appear but can be tuned down to 10% by cavity-length adjustment (e.g., by use of mirror adjustment means 15 in FIG. 1) and have been suppressed under some conditions such as changes in gas pressure from the normal 1.8 Torr used now. The amplifier also emits a 60 nsec pulse. The power output initially is 12 mJ (~200 kW) but the frequency width of the pulse has not been measured. Delays caused by malfunctions of the Lumonics equipment have prevented measurements of amplifier performance. In the meantime, a double-length amplifier is being constructed so that lower gas pressure can be used to achieve higher amplifier efficiency. It is planned to increase pumping power by removing the grating control from the Lumonics oscillator and substitute a $BCl_3$ cell as a frequency selector.

Recent work by the inventors with regard to a high power, $D_2O$ laser amplifier system, using the arrangement of FIG. 1, is now discussed. An efficient submillimeter mirrorless laser has been employed to explore for high pulsed power output at various wavelengths from several gases that should perform as well or better than methyl fluoride. The most promising gas, so far, is $D_2O$. It gave 50 kW output which is equal to the output of $CH_3F$ in the same mirrorless laser. Four lines were emitted from $D_2O$, the strongest being the well-known 384.6 $\mu$m line. This is a higher frequency than the 496 $\mu$m line from $CH_3F$ and is therefore more efficient for Thomson scattering from ion plasmas. Several new lines were found, namely, 359.3 $\mu$m, 479.3 $\mu$m, and 480.2 $\mu$m and other weaker ones. High $D_2O$ pressure suppresses the last two lines, but at 9 Torr the 384 $\mu$m and 359.3 $\mu$m are still present, but with lower intensity. The system was still oscillating at 18 Torr gas pressure. (Selection of a particular line can be accompanied by (1) using a polarizer; (2) tuning the length of the mirror-cavity; (3) changing pressure, and (4) using a filter.) All of the lines are elliptically polarized with 70% of the radiation perpendicular to the polarization of the pumping radiation from the Lumionics $CO_2$ laser system for the 384 $\mu$m and 359.3 $\mu$m lines. In the case of the other two lines, 70% of the radiation was parallel to the polarization of the pumping radiation. When $D_2O$ was used in the large cavity oscillator amplifier system, thirteen millijoules of power were obtained from two lines, the 384.6 $\mu$m line being five times stronger than the 359.3

μm line. The power in the peak of the output pulse was about 100 kW with another 100 kW in a long, low intensity tail.

In other work, methyl acetylene, $CH_3CCH$ in the system of FIG. 1 produced a narrow pulse of 35 MHz at 684 μm but the power level was disappointing.

Table 1 below lists twenty-six fluids (i.e., gases) that may be employed in the system of FIG. 1, that can be optically pumped by $CO_2$ laser. Each gas is assigned an index number between 1 and 26 and the index number is used to identify the gas in Table 2 hereinafter. The designation l and g indicate the state of the fluid, liquid and gas, respectively, at room temperature and at atmospheric pressure.

TABLE 1

| | Gas | liquid (l) of gas (g) at STP | Name |
|---|---|---|---|
| 1 | $C^{12}H_3F$ | g | fluoromethane, methyl fluoride |
| 2 | $C^{13}H_3F$ | g | methyl fluoride (isotopically enriched) |
| 3 | $CH_3CF_3$ | g | 1,1,1 trifluoroethane |
| 4 | $CH_3CHF_2$ | g | 1,1 difluoroethane, ethylidene fluoride |
| 5 | $CH_3CH_2F$ | g | fluoroethane, ethyl fluoride |
| 6 | $CH_3CCH$ | g | propyne, methylacetylene, propine |
| 7 | $CH_3OCH_3$ | g | dimethyl ether, methoxymethane, methyl ether |
| 8 | $CH_3OH$ | l | methanol, carbinol, methyl alcohol, wood alcohol |
| 9 | $CH_3OD$ | l | methanol-d, O-deuteromethanol |
| 10 | $CD_3OD$ | l | methan-$d^3$-ol-d, deuteroxy trideutero-methane, tetradeuteromethanol |
| 11 | $CH_3CN$ | l | nitrile acetic acid, acetonitrile, cyanomethane, ethanenitrile, methyl cyanide |
| 12 | $CH_3NH_2$ | g | aminomethane, methylamine |
| 13 | $CH_3Cl$ | g | chloromethane, methyl chloride |
| 14 | $CH_3Br$ | l | bromomethane, methyl bromide |
| 15 | $CH_3I$ | l | iodomethane, methyl iodide |
| 16 | $HCOOH$ | l | formic acid, methanoic acid |
| 17 | $CH_2Cl_2$ | l | dichloromethane, methylene chloride |
| 18 | $CH_2CHCN$ | l | nitrile propenoic acid, acrylonitrile, vinyl cyanide |
| 19 | $CH_2CF_2$ | g | 1,1 difluoroethane, vinylidine fluoride |
| 20 | $CH_2CHCl$ | g | chloroethene, vinyl chloride |
| 21 | $C_2H_4(OH)_2$ | l | 1,2 ethanediol, dihydroxyethane, ethylene glycol, glycol. $HOCH_2CH_2OH$ |
| 22 | $C_2H_5OH$ | l | ethanol, alcohol, ethyl alcohol, methyl carbinol |
| 23 | $C_2H_5Cl$ | l | chloroethane, ethyl chloride |
| 24 | $NH_3$ | g | ammonia |
| 25 | $O_3$ | g | ozone |
| 26 | $D_2O$ | l | deuterium oxide, heavy water |

In Table 2 below the twenty-six gases of Table 1 are given with a list of observed submillimeter laser wavelengths in numerical order. Also listed, for each submillimeter laser wavelength, are the transition of $CO_2$ pump laser and, where available, the polarization (i.e., the designation $\perp$ and // to represent perpendicular and parallel polarization, respectively, the horizontal lines indicating that no information has been found; the literature references are found in said Rosenbluh et al journal article), output power of the submillimeter laser, and the power and pulse length of the $CO_2$ pump laser.

The data in Table 2, in all cases, relate to a system employing a $CO_2$ laser to effect optical pumping in a system of the type shown in FIG. 1. Table 2 includes some data in the one-to-two millimeter range and there is no reason why the centimeter range cannot be achieved. Also, shorter wavelengths can be obtained in the system of FIG. 1 by optical pumping with $CO_2$ radiation in OCS and $SF_6$ gas, for example, but these possibilities are not shown in Table 1; nor are other shorter wavelength outputs listed, as later discussed herein.

TABLE 2:

SUBMILLIMETER LASER WAVELENGTHS LISTED BY GASES

| $\lambda(\mu m)$ | $CO_2$ Line | Pol. | $CO_2$ Source | $W_{in}$ | $mW_{out}$ |
|---|---|---|---|---|---|
| \multicolumn{6}{c}{$C^{12}H_3F(1)$} | | | | | |
| 190.3 | 9P30 | | T | — | — |
| 192.78 | 10R32 | // | C | 55 | 4.7 |
| 195.0 | 9R42 | — | T | — | — |
| 199.14 | 10R32 | // | C | — | — |
| 200.3 | 9R40 | — | T | — | — |
| 215.3 | 9R36 | — | T | — | — |
| 251.91 | 10R34 | // | C | 83 | .17 |
| 372.68 | 9P50 | // | C | 14 | 5.8 |
| 397.51 | 9P50 | // | C | — | — |
| 419 | 9P20 | — | T | 10 M | .1K |
| 451.903 | 9P20 | $\perp$ | Q | 1.5 K | <.1 W |
| 451.924 | 9P20 | $\perp$ | Q | 1.5 K | <.1 W |
| 496.072 | 9P20 | $\perp$ | Q | 1.5 K | <.1 W |
| | | | C | 10–20 | 1 |
| 496.105 | 9P20 | $\perp$ | Q | 1.5 K | .1 W |
| | | | C | 50 | 13 |
| | | | T | 10 M | 10 K |
| | | | CW | 7.6 | 3.0 |
| 541.113 | 9P20 | $\perp$ | Q | 1.5 K | <.1 |
| 541.147 | 9P20 | $\perp$ | Q | 1.5 K | <.1 |
| 595 | 9P20 | — | T | 10 M | — |
| \multicolumn{6}{c}{$C^{13}H_3F(2)$} | | | | | |
| 1221.79 | 9P32 | // | C | 58 | 2.4 |
| \multicolumn{6}{c}{$CH_3CF_3(3)$} | | | | | |
| 379 | 10P32 | — | T | — | — |
| \multicolumn{6}{c}{$CH_3CHF_2(4)$} | | | | | |
| 458 | 10P20 | — | CW | 9.7 | St. |
| 464 | 10P20 | — | T | — | — |
| 533 | 10P20 | — | CW | 9.7 | St. |
| 755 | 10P14 | — | T | — | — |
| \multicolumn{6}{c}{$CH_3CH_2F(5)$} | | | | | |

TABLE 2:-continued
SUBMILLIMETER LASER WAVELENGTHS LISTED BY GASES

| λ(μm) | CO₂ Line | Pol. | CO₂ Source | $W_{in}$ | $mW_{out}$ |
|---|---|---|---|---|---|
| 206.60 | 10P36 | — | C | 100–150 | — |
| 217.1 | 9R14 | — | C | 100–150 | — |
| 226.9 | 10P40 | — | C | 100–150 | — |
| 264.0 | 9P18 | — | CW | ≦25 | .015 |
| 264.7 | 9P18 | — | C | 100–150 | — |
| 282.3 | 9R12 | — | C | 100–150 | — |
| 330.2 | 9R22 | — | C | 100–150 | — |
| 336 | 9R16 | — | CW | ≦25 | 3μ |
| 336.7 | 9R16 | — | C | 100–150 | — |
| 362.1 | 9R18 | — | C | 100–150 | — |
| 376.0 | 9R14 | — | C | 100–150 | — |
| 378.0 | 9R32 | — | C | 100–150 | — |
| 404 | 9R30 | — | CW | ≦25 | .01 |
| 404 | 9P34 | — | C | 100–150 | — |
| 405.0 | 9P34 | — | CW | ≦25 | .3μ |
| 405.50 | 9R30 | — | C | 100–150 | — |
| 462.92 | 9P32 | — | C | 100–150 | — |
| 486 | 9R24 | — | CW | ≦25 | 5μ |
| 502.2 | 9R24 | — | C | 100–150 | — |
| 504 | 9R24 | — | CW | ≦25 | .015 |
| 519 | 9R 4 | — | CW | ≦25 | 1μ |
| 540.9 | 9P38 | — | C | 100–150 | — |
| 593.32 | 9P36 | — | C | 100–150 | — |
| 595 | 9P36 | — | CW | ≦25 | 2μ |
| 620 | 9P22 | — | CW | ≦25 | 1μ |
| 620.4 | 9P22 | — | C | 100–150 | — |
| 851.9 | 9P30 | — | C | 100–150 | — |
| 853 | 9P30 | — | CW | ≦25 | 2μ |
| 1013 | 9P28 | — | CW | ≦25 | .1μ |
| 1069 | 9R10 | — | CW | ≦25 | 3μ |
| 1546 | 9P10 | — | CW | ≦25 | 3μ |
| CH₃CCH(6) | | | | | |
| 427.89 | 10P10 | // | C | 93 | 3μ |
| 428.87 | 9R38 | // | C | 20 | .012 |
| 488.88 | 10P12 | // | C | 67 | .06 |
| 516.77 | 9R12 | // | C | 47 | 6μ |
| 531.08 | 9P6 | // | C | 45 | 4μ |
| 563.13 | 10P24 | // | C | 108 | 9μ |
| 566.44 | 9P18 | // | C | 63 | .58 |
| 583.77 | 9P20 | // | C | 50 | 4μ |
| 647.89 | 10P14 | // | C | 100 | 3.3 |
| 649.59 | 10P34 | ⊥ | C | 92 | .9μ |
| 675.29 | 9P40 | // | C | 55 | .33 |
| 757.41 | 10P10 | // | C | 92 | 3μ |
| 798.55 | 10P20 | // | C | 100 | .013 |
| 1097.11 | 9P8 | // | C | 50 | .32 |
| 1174.87 | 10P44 | // | C | 35 | 2.7 |
| CH₃OCH₃(7) | | | | | |
| 375 | 10P20 | // | C | <100 | 1–5 |
| 461 | 10P34 | ⊥ | C | <100 | <1 |
| 480 | 10P34 | ⊥ | C | <100 | <1 |
| 492 | 10P34 | ⊥ | C | <100 | ≧10 |
| 495 | 10P12 | // | C | <100 | <1 |
| 520 | 10P12 | // | C | <100 | ≧10 |
| CH₃OH(8) | | | | | |
| 37.5 | 9P32 | — | CW | 3.7 | .5 |
| 40.2 | 9P34 | — | CW | 3.5 | ~1 |
| 41.7 | 9P32 | — | CW | 3.7 | 4 |
| 43.4 | 9P34 | — | CW | 3.5 | ~.1 |
| 58.1 | 9P14 | — | T | .2–1 M | 2 W |
| 65.1 | 9R18 | — | T | .2–1 M | 5 W |
| 65.6 | 9P34 | — | CW | 3.5 | .5 |
| 70.6 | 9P34 | ⊥ | C | 10–20 | .5 |
| | | | CW | 3.5 | 2 |
| | | | C | ≦16 | .012 |
| | | | CW | 4 | >1 |
| 78 | 10R16 | — | C | 10 | .2 |
| 80.3 | 9P34 | — | CW | 3.5 | .2 |
| 96 | 9R10 | — | CW | ≦25 | .6 |
| | | // | CW | ≦3 | St. |
| 96.48 | 9R10 | — | C | 100–150 | — |
| 98 | 10R40 | — | C | 10 | .03 |
| 118.8 | 9P36 | ⊥ | C | 10–20 | 3 |
| | | ⊥ | CW | 3.0 | 3 |
| | | | C | ≦16 | .9 |
| | | | CW | 4 | >1 |
| 121 | 10R44 | — | C | 9 | .01 |
| 130 | 10R34 | ⊥ | CW | ≦3 | Med. |
| 151.35 | 9R26 | — | C | 100–150 | — |
| 162 | 10R38 | — | CW | ≦25 | .6 |
| 163 | 10R38 | — | C | 10 | .3 |
| 163.01 | 10R34 | — | C | 100–150 | — |
| 163.9 | 9P12 | — | T | — | — |
| 164 | 10R38 | // | CW | 5 | .5 |
| 164.3 | 9P16 | ⊥ | C | 10–20 | 1 |
| 165 | 9R10 | ⊥ | CW | ≦3 | Med. |
| 165 | 9P14 | — | C | 5 | .03 |
| 170.6 | 9P36 | // | C | 10–20 | 3 |
| | | | CW | 4 | .3 |
| 185.5 | 9P34 | ⊥ | C | 10–20 | .1 |
| 186.03 | 9R18 | — | C | 100–150 | — |
| 190.8 | 9P34 | ⊥ | C | 10–20 | .1 |
| 191.2 | 10R 4 | — | C | 100–150 | — |
| 191.57 | 10R10 | — | C | 100–150 | — |
| 191.63 | 9R16 | — | C | 100–150 | — |
| 193.2 | 9P38 | ⊥ | C | 10–20 | .1 |
| | | ⊥ | CW | 4.0 | Wk. |
| | | | C | ≦16 | .04 |
| 193.8 | 9P38 | — | CW | 4 | Wk. |
| 198.8 | 9P38 | ⊥ | C | 10–20 | .5 |
| 202.4 | 9P36 | // | C | 10–20 | 1 |
| 205.3 | 9P18 | — | T | — | — |
| 211 | 10R 4 | — | C | 10 | .3 |
| 223.5 | 9P16 | // | C | 10–20 | 1 |
| 232 | 9R10 | — | CW | ≦25 | .03 |
| 232.93 | 9R 8 | — | C | 100–150 | — |
| 233 | 9R10 | // | CW | ≦3 | St. |
| 237.6 | 9P34 | // | C | 10–20 | .5 |
| 242 | 10R34 | — | C | 10 | .3 |
| 242.79 | 10R32 | — | C | 100–150 | — |
| 243 | 10R34 | — | CW | ≦3 | Wk. |
| 246 | 10R38 | ⊥ | CW | 5 | 1.0 |
| 249 | 10R34 | — | CW | ≦25 | .2 |
| 251 | 10R44 | — | C | 9 | .01 |
| 253.6 | 9P34 | // | C | 10–20 | .5 |
| 254 | 10R38 | — | CW | ≦25 | .6 |
| 254.1 | 9P34 | // | C | 10–20 | 1 |
| 263.7 | 9P34 | // | C | 10–20 | 1 |
| 264.6 | 9P34 | // | C | 10–20 | 1 |
| 274 | 10R46 | — | C | 8 | .03 |
| 278.8 | 9P38 | // | C | 10–20 | .1 |
| 286 | 10R48 | — | C | 7 | 1 |
| 292 | 10R10 | — | CW | ≦25 | .03 |
| 292.2 | 9P38 | // | C | 10–20 | .1 |
| 292.5 | 9P34 | ⊥ | C | 10–20 | .1 |
| 369.1 | 9P16 | // | C | 10–20 | 3 |
| 392.3 | 9P36 | ⊥ | C | 10–20 | 3 |
| | | ∜ | CW | 4.0 | St. |
| 417 | 9P14 | — | C | 5 | .01 |
| 417.8 | 9P36 | ⊥ | C | 10–20 | 1 |
| 451.9 | 9P12 | — | T | .2–1M | .7 W |
| 469 | 10R38 | — | C | 10 | .06 |
| 470 | 10R38 | ⊥ | CW | 5 | .1 |
| 471 | 10R38 | — | CW | ≦25 | .2 |
| 495 | 10R 4 | — | C | 10 | .01 |
| 570.5 | 9P 16 | // | C | 10–20 | 3 |
| | | | CW | 5.0 | 1 |
| | | | T | .2–1M | 1 W |
| 627.34 | 9P 16 | — | C | 100–150 | — |
| 694 | 10R16 | — | C | 10 | .01 |
| 699.5 | 9P34 | ⊥ | C | 10–20 | .1 |
| | | ⊥ | CW | 3.5 | .5 |
| 1217 | 9P16 | — | C | 5 | .01 |
| | | // | C | 3 | .1 |
| CH₃OD(9) | | | | | |
| 57 | 9R 8 | ∜ | CW | ≦3 | St. |

TABLE 2:-continued
SUBMILLIMETER LASER WAVELENGTHS LISTED BY GASES

| λ(μm) | CO₂ Line | Pol. | CO₂ Source | $W_{in}$ | $mW_{out}$ |
|---|---|---|---|---|---|
| 104 | 9P30 | ⊥ | CW | ≦3 | Med. |
| 110 | 10R44 | ⊥ | CW | ≦3 | Wk. |
| 117 | 9P26 | // | CW | ≦3 | Med. |
| 146 | 9P30 | ⊥ | CW | ≦3 | Wk. |
| 216 | 9R14 | ⊥ | CW | ≦3 | Wk. |
| 295 | 9R 8 | ⊥ | CW | ≦3 | St. |
| 307 | 9R 8 | ⊥ | CW | ≦3 | St. |
| CD₃OD(10) | | | | | |
| 41 | 10R18 | ⊥ | CW | 3 | — |
| 184 | 10R24 | ⊥ | CW | 3 | — |
| 229 | 10R10 | ⊥ | CW | 3 | — |
| 255 | 10R36 | ⊥ | CW | 3 | — |
| 299 | 10R24 | ⊥ | CW | 3 | — |
| 312 | 10R10 | ⊥ | CW | 3 | — |
| 339 | 10R 4 | ⊥ | CW | 3 | — |
| 406 | 10R12 | ⊥ | CW | 3 | — |
| CH₃CN(11) | | | | | |
| 281.18 | 9P34 | ⊥ | C | 44 | .018 |
| 281.98 | 9P50 | // | C | 38 | .67 |
| 286.88 | 9P50 | // | C | 38 | .29 |
| 303.54 | 10P 10 | // | C | 68 | 3μ |
| 346.32 | 9P 16 | // | C | 70 | .45 |
| 372.87 | 10P20 | // | C | 84 | 3.54 |
| 373 | 10P20 | — | T | 2M | 80 W |
|  |  |  | CW | ≦25 | .01 |
| 380.71 | 10P16 | // | C | 88 | 7μ |
| 386.41 | 9P46 | // | C | 42 | 3μ |
| 387.31 | 9R12 | ⊥ | C | 44 | .38 |
| 388.39 | 9P22 | // | C | 69 | 5μ |
| 392 | 9R12 | — | CW | ≦25 | .5μ |
| 422.14 | 10P24 | // | C | 110 | .017 |
| 427.04 | 9P26 | ⊥ | C | 61 | .024 |
| 430.55 | 10P18 | // | C | 46 | .19 |
| 441.15 | 9R16 | ⊥ | C | 43 | .18 |
| 453.41 | 9R16 | ⊥ | C | 43 | .75 |
| 456 | 9R16 | — | CW | ≦25 | 4μ |
| 466.25 | 9R16 | ⊥ | C | 43 | .56 |
| 480.01 | 9R16 | ⊥ | C | 43 | .2 |
| 494.74 | 9P6 | ⊥ | C | 51 | 4.0 |
| 496 | 9P6 | — | CW | ≦25 | 6μ |
| 510.16 | 9P6 | ⊥ | C | 51 | .19 |
| 561.41 | 9R8 | // | C | 42 | .18 |
| 652.68 | 9P30 | // | C | 77 | .32 |
| 653 | 9P30 | — | CW | ≦25 | .05μ |
| 704.53 | 9R34 | // | C | 41 | .12 |
| 713.72 | 10P32 | // | C | 44 | .68 |
| 741.62 | 9R8 | ⊥ | C | 48 | .23 |
| 854.41 | 9P16 | // | C | 70 | .13 |
| 1014.89 | 9R14 | ⊥1 | C | 43 | .018 |
| 1016.33 | 9P8 | // | C | 33 | .45 |
| 1086.89 | 9P40 | ⊥ | C | 46 | .15 |
| 1164.83 | 9P10 | // | C | 45 | .05 |
| 1351.78 | 9R20 | ⊥ | C | 49 | .02 |
| 1814.37 | 10P46 | // | C | 48 | .34 |
| CH₃NH₂ (12) | | | | | |
| 99.5 | 9R14 | // | C | <100 | <1 |
| 104 | 9P28 | ⊥ | C | <100 | <1 |
| 115.5 | 9P44 | // | C | <100 | 1-5 |
| 118 | 9P 8 | ⊥ | C | <100 | <1 |
| 126 | 10R 6 | // | C | <100 | 1-5 |
| 134 | 9R14 | ⊥ | C | <100 | <1 |
| 134 | 9R18 | ⊥ | C | <100 | <1 |
| 139 | 9R14 | // | C | <100 | <1 |
| 141 | 10R22 | // | C | <100 | <1 |
| 143 | 9R14 | // | C | <100 | <1 |
| 147 | 9P24 | ⊥ | C | <100 | 5-10 |
| 148.5 | 9P24 | ⊥ | CW | 4-10 | 10.0 |
| 153 | 9P 8 | // | C | <100 | 1-5 |
| 159 | 9P24 | ⊥ | C | <100 | 1-5 |
| 164 | 9R18 | // | C | <100 | 1-5 |
| 166 | 9P32 | ⊥ | C | <100 | 1-5 |
| 168 | 9R22 | // | C | <100 | <1 |
| 175 | 10R 6 | // | C | <100 | <1 |
| 176 | 10R32 | ⊥ | C | <100 | 1-5 |
| 177 | 9R12 | // | C | <100 | 1-5 |
| 180 | 9P46 | — | CW | ≦25 | .1μ |
| 183 | 9R14 | ⊥ | C | <100 | 1-5 |
| 194 | 9R 8 | // | C | <100 | <1 |
| 198.0 | 9P24 | // | CW | 4-10 | 1.0 |
| 198 | 9R20 | // | C | <100 | <1 |
| 201 | 9R12 | // | C | <100 | <1 |
| 208 | 9R12 | // | C | <100 | 1-5 |
| 218.0 | 9P24 | // | CW | 4-10 | 1.0 |
| 219 | 9P32 | // | C | <100 | 1-5 |
| 243 | 9P24 | // | C | < | |
| 251.3 | | | | 1-5 | |
| 241.3 | 9P 4 | // | CW | 4-10 | .30 |
| 267 | 9P40 | // | C | <100 | 1-5 |
| 268 | 9R12 | ⊥ | C | <100 | 1-5 |
| 288 | 9R 4 | — | CW | ≦25 | .015 |
| 314 | 9R 4 | — | CW | ≦25 | .03 |
| 347 | 10R20 | // | C | <100 | 1-5 |
| CH₃Cl (13) | | | | | |
| 227.15 | 9P48 | // | C | 26 | .072 |
| 236.25 | 9R 2 | ⊥ | C | 13 | .1 |
| 240.98 | 10R10 | // | C | 90 | 1.3 |
| 250.4 | 9P30 | — | T | — | — |
| 254 | 10P10 | — | CW | ≦40 | .1 |
| 261.03 | 10P34 | // | C | 106 | .069 |
| 271.29 | 10P20 | ⊥ | C | 86 | .33 |
| 273.7 | 9P12 | — | T | — | — |
| 275.00 | 9R14 | // | C | 44 | 1.7 |
| 275.09 | 9R36 | // | C | 60 | .05 |
| 281.67 | 9R14 | — | C | 44 | — |
| 286.79 | 10R34 | ⊥ | C | 69 | .31 |
| 307.65 | 11P19 | // | C | 23 | .57 |
| 333 | 9P42 | — | T | 2M | 0.8W |
| 333.96 | 9P42 | ⊥ | C | 47 | 44 |
| 349.34 | 10R18 | // | C | 89 | 7.4 |
| 354 | 10R18 | — | CW | ≦40 | .01 |
| 364.5 | 9R16 | — | T | — | — |
| 378.57 | 9R16 | ⊥ | C | 29 | .18 |
| 397.6 | 10R24 | — | T | — | — |
| 461.20 | 9R42 | ⊥ | C | 11 | .027 |
| 511.90 | 10R52 | ⊥ | C | 17 | .065 |
| 568.81 | 10R26 | // | C | 97 | .022 |
| 870.80 | 9P52 | // | C | 16 | 1.3 |
| 943.97 | 9R12 | // | C | 45 | 13 |
| 958.25 | 9P38 | // | C | 40 | .52 |
| 968 | 9R12 | — | CW | ≦20 | .01 |
| 1886.87 | 9P26 | ⊥ | C | 57 | 1.6 |
| CH₃Br (14) | | | | | |
| 245.04 | 9P28 | // | C | 57 | .89 |
| 264.05 | 10R10 | // | C | 73 | 5.3 |
| 279.81 | 10R52 | // | C | 51 | .012 |
| 294.28 | 10R28 | // | C | 117 | 1.1 |
| 311.07 | 10R12 | ⊥ | C | 69 | .019 |
| 311.10 | 10P20 | // | C | 52 | 1.0 |
| 311.20 | 10P40 | ⊥ | C | 21 | 1.5 |
| 311.21 | 10R50 | ⊥ | C | 15 | .33 |
| 332.86 | 10R 6 | ⊥ | C | 64 | .35 |
| 333.15 | 10P 8 | // | C | 83 | 9μ |
| 352.75 | 9P18 | ⊥ | C | 66 | 2.3 |
| 380.02 | 10R18 | ⊥ | C | 83 | 7.0 |
| 407.72 | 9P28 | // | C | 57 | .013 |
| 414.98 | 10R 2 | ⊥ | C | 46 | 17 |
| 418.31 | 10P26 | // | C | 101 | .49 |
| 422.78 | 10R26 | // | C | 117 | 9μ |
| 508.48 | 10R42 | // | C | 47 | 2.1 |
| 531.06 | 10P24 | // | C | 108 | 5.5 |
| 545.21 | 10P38 | ⊥ | C | 39 | 8.8 |
| 545.39 | 10R32 | // | C | 63 | 10 |
| 564.68 | 10P38 | — | C | 39 | — |
| 585.72 | 9P40 | // | C | 49 | 3.3 |

TABLE 2:-continued
SUBMILLIMETER LASER WAVELENGTHS LISTED BY GASES

| λ(μm) | CO$_2$ Line | Pol. | CO$_2$ Source | W$_{in}$ | mW$_{out}$ |
|---|---|---|---|---|---|
| 631.93 | 10P16 | // | C | 78 | 2.1μ |
| 632.00 | 10P22 | ⊥ | C | 88 | .025 |
| 658.53 | 9P56 | // | C | 52 | 5.2 |
| 660.70 | 10R20 | ⊥ | C | 68 | 15 |
| 715.40 | 10R14 | ⊥ | C | 63 | 1.6 |
| — | 10R14 | — | T | 2M | .4W |
| 749.29 | 10P14 | ⊥ | C | 73 | 2.8 |
| 749.36 | 10R14 | ⊥ | C | 63 | — |
| 831.13 | 10P28 | // | C | 105 | 5.4 |
| 925.52 | 10R46 | // | C | 33 | 14 |
| 990.51 | 10P10 | // | C | 95 | 1.3 |
| 1310.38 | 10R 4 | ⊥ | C | 90 | 5.3 |
| 1572.64 | 10P 4 | // | C | 58 | 2.2 |
| 1965.34 | 10P28 | // | C | 105 | 1.3 |

CH$_3$I (15)

| λ(μm) | CO$_2$ Line | Pol. | CO$_2$ Source | W$_{in}$ | mW$_{out}$ |
|---|---|---|---|---|---|
| 377.45 | 9R16 | // | C | 47 | 5.1 |
| 378 | 9R14 | — | — | — | — |
| 390.53 | 10P42 | // | C | 57 | 1.8 |
| 392.48 | 9R14 | // | C | 40 | .017 |
| 447.17 | 10P18 | // | C | 103 | 23 |
| 447.5 | 10P18 | — | — | — | — |
| 457.25 | 10P18 | — | C | 103 | — |
| 459.18 | 10P 8 | ⊥ | C | 69 | .16 |
| 477.87 | 9P26 | // | C | 82 | .021 |
| 508.37 | 9P34 | // | C | 66 | 13 |
| 517.33 | 10P14 | // | C | 81 | .38 |
| 525.32 | 9P 4 | // | C | 26 | .093 |
| 529.28 | 10P36 | // | C | 60 | 3.2 |
| 542.99 | 10P26 | // | C | 99 | 2μ |
| 576.17 | 10P16 | // | C | 58 | 1.6 |
| 578.90 | 10R34 | // | C | 68 | .98 |
| 583.87 | 9P 4 | // | C | 32 | .12 |
| 639.73 | 9P 6 | // | C | 35 | .17 |
| 670.99 | 10P28 | // | C | 91 | .93 |
| 719.30 | 10P22 | // | C | 52 | .33 |
| 1063.29 | 10P38 | // | C | 71 | 6.5 |
| 1253.67 | 10P32 | // | C | 98 | 13 |
| 1254.4 | 10P32 | — | — | — | — |

HCOOH (16)

| λ(μm) | CO$_2$ Line | Pol. | CO$_2$ Source | W$_{in}$ | mW$_{out}$ |
|---|---|---|---|---|---|
| 229.39 | 9R32 | — | C | 100-150 | — |
| 254.5 | 9P20 | // | CW | ≦7 | 0.1 |
| 254.80 | 9P20 | — | C | 100-150 | — |
| 278.5 | 9P30 | // | CW | ≦7 | .02 |
| 278.61 | 9P30 | — | C | 100-150 | — |
| 302.08 | 9P 8 | — | C | 100-150 | — |
| 303.0 | 9R 2 | // | CW | ≦7 | .6 |
| 309 | 10R22 | // | C | <100 | 1-5 |
| 309.23 | 9R 4 | — | C | 100-150 | — |
| 311.0 | 10R22 | // | CW | ≦7 | .2 |
| 311.45 | 10R22 | — | C | 100-150 | — |
| 319.48 | 10R22 | — | C | 100-150 | — |
| 334.82 | 9P18 | — | C | 100-150 | — |
| 334.91 | 9R14 | — | C | 100-150 | — |
| 336.3 | 9R12 | // | CW | ≦7 | .04 |
| 342.74 | 9R14 | — | C | 100-150 | — |
| 359.81 | 9R34 | — | C | 100-150 | — |
| 368 | 9R18 | — | C | <100 | 1-5 |
| 388 | 9R16 | // | C | <100 | ≧10 |
| 392 | 9R18 | — | C | <100 | 1-5 |
| 393.5 | 9R14 | // | CW | ≦7 | .3 |
| 393.6 | 9R18 | — | CW | 7.6 | .93 |
| 393.62 | 9R18 | — | C | 100-150 | 100 |
| 394.2 | 9R16 | // | CW | ≦7 | 3.0 |
| 401 | 9R16 | // | C | <100 | 1-5 |
| 403 | 9R18 | // | C | <100 | 1-5 |
| 404.1 | 10P42 | — | C | 100-150 | — |
| 405.0 | 9P26 | // | CW | ≦7 | .01 |
| 405.55 | 9R18 | — | C | 100-150 | — |
| 405.75 | 9P26 | — | C | 100-150 | — |
| 406.0 | 9R16 | // | CW | ≦7 | 1.0 |
| 413 | 9R16 | // | C | <100 | <1 |
| 414 | 9R22 | // | C | <100 | 5-10 |
| 414 | 9R20 | // | C | <100 | 1-5 |
| 418.51 | 9R24 | — | C | 100-150 | — |
| 419.5 | 9R22 | — | CW | 7.6 | .18 |
| 419.55 | 9R22 | — | C | 100-150 | — |
| 420.0 | 9R18 | // | CW | ≦7 | 1.5 |
| 420.26 | 9R 8 | — | C | 100-150 | — |
| 421.0 | 9R 6 | — | CW | ≦7 | .07 |
| 421. | 9R18 | — | C | 100-150 | — |
| 428 | 9R18 | // | C | <100 | 1-5 |
| 428 | 9R20 | // | C | <100 | ≧10 |
| 432.50 | 9R20 | — | C | 100-150 | — |
| 433.0 | | — | CW | 7.6 | 1.5 |
| 433.0 | 9R18 | // | CW | ≦7 | 2.0 |
| 433.0 | 9R22 | — | CW | ≦25 | .5 |
| 433.10 | 9R22 | — | C | 100-150 | — |
| 435 | 9P16 | — | C | <100 | <1 |
| 437.6 | 9P16 | ⊥ | CW | ≦7 | .08 |
| 437.70 | 9P16 | — | C | 100-10 | — |
| 441 | 9R18 | — | C | 100-150 | <1 |
| 445.21 | 10P14 | — | C | 100-150 | — |
| 445.81 | 9R20 | — | C | 100-150 | — |
| 446.75 | 9R16 | — | C | 100-150 | — |
| 447.0 | 9R14 | // | CW | ≦7 | 0.1 |
| 447.58 | 9R22 | — | C | 100-150 | — |
| 458.43 | 9R36 | — | C | 100-150 | — |
| 458.6 | 9R34 | // | CW | ≦7 | 0.4 |
| 460.51 | 9R10 | — | C | 100-150 | — |
| 492 | 9P42 | — | C | 100-150 | — |
| 493.28 | 9P14 | — | C | 100-150 | — |
| 496 | 9R18 | — | C | <100 | <1 |
| 512 | 9R28 | // | C | <100 | ≧10 |
| 512 | 9R26 | // | C | <100 | 5-10 |
| 512.88 | 9R28 | — | C | 100-150 | — |
| 513.2 | 9R24 | ⊥ | CW | ≦7 | 0.8 |
| 518.83 | 9P16 | — | C | 100-150 | — |
| 530 | 9R28 | // | C | <100 | <1 |
| 530 | 9R26 | // | C | <100 | <1 |
| 534.5 | 9P18 | // | CW | ≦7 | 0.02 |
| 534.8 | 9R24 | // | CW | ≦7 | 0.3 |
| 577 | 9P38 | — | C | <100 | 1-5 |
| 580.52 | 9P38 | — | C | 100-150 | — |
| 582.0 | 9P38 | ⊥ | CW | ≦7 | 0.02 |
| 670.0 | 9R26 | // | CW | ≦7 | 0.2 |
| 743.0 | 9R36 | // | CW | ≦7 | 0.5 |
| 745.0 | 9R20 | // | CW | ≦7 | 0.2 |
| 761 | 9R24 | — | CW | ≦25 | .5μ |
| 785 | 9R10 | — | CW | ≦25 | .01 |

CH$_2$Cl$_2$ (17)

| λ(μm) | CO$_2$ Line | Pol. | CO$_2$ Source | W$_{in}$ | mW$_{out}$ |
|---|---|---|---|---|---|
| 258 | 10P26 | — | CW | ≦40 | 0.1 |

CH$_2$CHCN (18)

| λ(μm) | CO$_2$ Line | Pol. | CO$_2$ Source | W$_{in}$ | mW$_{out}$ |
|---|---|---|---|---|---|
| 270.6 | 10P26 | ⊥ | CW | 4-10 | .06 |
| 489 | 10P 8 | — | CW | ≦25 | .06μ |
| 503 | 9R12 | — | CW | ≦25 | .04μ |
| 550.0 | 10P14 | // | CW | 4-10 | .06 |
| 574.4 | 10R16 | ⊥ | CW | 4-10 | .30 |
| 578 | 10R14 | — | CW | ≦25 | 1μ |
| 584.0 | 10P12 | ⊥ | CW | 4-10 | .06 |
| 586.6 | 10P20 | // | CW | 4-10 | .32 |
| 623 | 10R12 | — | CW | ≦25 | 0.1μ |
| 631 | 10R 6 | — | CW | ≦25 | 0.1μ |
| 722 | 10P42 | — | CW | ≦25 | 0.05μ |
| 738 | 10P16 | — | CW | ≦25 | 0.06μ |
| 775 | 10R42 | — | CW | ≦25 | 0.1μ |
| 793 | 10R40 | — | CW | ≦25 | 0.1μ |
| 828 | 10R18 | — | CW | ≦25 | 0.1μ |
| 910 | 10R12 | — | CW | ≦25 | 0.1μ |
| 940 | 10P28 | — | CW | ≦25 | 0.1μ |
| 1156 | 10P26 | — | CW | ≦25 | 0.06μ |
| 1184 | 10R38 | — | CW | ≦25 | 0.6μ |

CH$_2$CF$_2$ (19)

| λ(μm) | CO$_2$ Line | Pol. | CO$_2$ Source | W$_{in}$ | mW$_{out}$ |
|---|---|---|---|---|---|
| 288.5 | 10P12 | // | CW | 4-10 | 0.30 |
| 375.0 | 10P12 | // | CW | 4-10 | 1.60 |

TABLE 2:-continued
SUBMILLIMETER LASER WAVELENGTHS LISTED BY GASES

| $\lambda(\mu m)$ | $CO_2$ Line | Pol. | $CO_2$ Source | $W_{in}$ | $mW_{out}$ |
|---|---|---|---|---|---|
| 415 | 10P14 | — | CW | 7.5 | St. |
| 458.0 | 10P30 | // | CW | 4–10 | 0.20 |
| 464.3 | 10R20 | // | CW | 4–10 | 0.30 |
| 523 | 10P16 | — | CW | ≦25 | .01 |
| 554 | 10P14 | — | CW | 6.0 | 1 |
| 554.4 | 10P14 | ⊥ | CW | 4–10 | 3.00 |
| 568 | 10P24 | — | CW | 7.5 | St. |
| 663 | 10P24 | — | CW | 7.5 | Med. |
| 663.3 | 10P24 | // | CW | 4–10 | 0.20 |
| 884 | 10P12 | — | CW | 5.0 | 1 |
| 890.0 | 10P22 | // | CW | 4–10 | 0.30 |
|  |  |  | CW | 8.0 | .1 |
| 890.1 | 10P22 | // | CW | 4–10 | 0.20 |
| 990.0 | 10P22 | // | CW | 4–10 | 0.20 |
|  |  |  | CW | 8.0 | Wk. |
| 1020 | 10P14 | — | CW | 6.0 | .05 |

$CH_2CHCl$ (20)

| $\lambda(\mu m)$ | $CO_2$ Line | Pol. | $CO_2$ Source | $W_{in}$ | $mW_{out}$ |
|---|---|---|---|---|---|
| 386.0 | 10P22 | ⊥ | C | 10–20 | .5 |
| 424 | 10R28 | — | CW | ≦25 | 3μ |
| 445 | 10R18 | — | CW | ≦25 | 1μ |
| 487 | 9P10 | — | CW | ≦25 | 0.06μ |
| 507.7 | 10P22 | ⊥ | C | 10–20 | 1 |
| 519 | 10P34 | — | CW | ≦25 | 0.4μ |
| 532 | 9P16 | — | CW | ≦25 | 1μ |
| 538 | 10R 4 | — | CW | ≦25 | 0.1μ |
| 574 | 10P16 | — | CW | ≦25 | .015 |
| 603 | 10P38 | — | CW | ≦25 | .025 |
| 634.4 | 9P20 | // | C | 10–20 | .5 |
| 638 | 10P 6 | — | CW | ≦25 | 3μ |
| 699 | 9P22 | — | CW | ≦25 | 0.6μ |
| 707 | 9P18 | — | CW | ≦25 | .010 |
| 828 | 9P24 | — | CW | ≦25 | 2μ |
| 935 | 10P46 | — | CW | ≦25 | 0.5μ |
| 995 | 10R26 | — | CW | ≦25 | 2μ |
| 1041 | 10R36 | — | CW | ≦25 | 2μ |

$C_2H_4(OH)_2$ (21)

| $\lambda(\mu m)$ | $CO_2$ Line | Pol. | $CO_2$ Source | $W_{in}$ | $mW_{out}$ |
|---|---|---|---|---|---|
| 62.5 | 10R16 | — | C | <100 | 1–5 |
| 69.1 | 10R16 | — | C | <100 | 1–5 |
| 70.1 | 9P34 | ⊥ | C | <100 | ≧10 |
| 75.2 | 9P32 | — | C | <100 | <1 |
| 77.4 | 10R16 | — | C | <100 | 1–5 |
| 90.8 | 9P32 | // | C | <100 | <1 |
| 95.8 | 9R10 | // | C | <100 | 5–10 |
| 109.1 | 9R16 | — | C | <100 | <1 |
| 117.1 | 9P14 | // | C | <100 | 5–10 |
| 118 | 10P30 | — | C | <100 | <1 |
| 118 | 9P36 | ⊥ | C | <100 | 1–5 |
| 118.9 | 9P34 | // | C | <100 | 5–10 |
| 125.8 | 9P34 | // | C | <100 | 1–5 |
| 132 | 9P24 | ⊥ | C | <100 | 1–5 |
| 132 | 9P36 | ⊥ | C | <100 | 1–5 |
| 135 | 9P36 | ⊥ | C | <100 | <1 |
| 164 | 9R10 | ⊥ | C | <100 | 1–5 |
| 164 | 9P14 | ⊥ | C | <100 | 1–5 |
| 164 | 9P16 | ⊥ | C | <100 | 1–5 |
| 169 | 9P36 | ⊥ | C | <100 | <1 |
| 171 | 9R 8 | — | C | <100 | <1 |
| 185 | 9R18 | // | C | <100 | <1 |
| 185 | 9P34 | ⊥ | C | <100 | 1–5 |
| 189 | 9P34 | ⊥ | C | <100 | 1–5 |
| 189 | 9P36 | ⊥ | C | <100 | 1–5 |
| 192 | 9P38 | ⊥ | C | <100 | <1 |
| 197 | 9P38 | ⊥ | C | <100 | ≧10 |
| 200 | 9P36 | // | C | <100 | <1 |
| 231 | 9R10 | // | C | <100 | 1–5 |
| 240 | 9R10 | // | C | <100 | 1–5 |
| 250 | 9R18 | // | C | <100 | 1–5 |
| 252 | 9P34 | // | C | <100 | <1 |
| 262 | 9P34 | // | C | <100 | 1–5 |
| 277 | 9P38 | // | C | <100 | 5–10 |
| 288 | 9P12 | ⊥ | C | <100 | <1 |
| 290 | 9P38 | ⊥ | C | <100 | 1–5 |
| 299 | 9P34 | // | C | <100 | 1–5 |
| 344 | 9P22 | // | C | <100 | <1 |
| 358 | 9P34 | ⊥ | C | <100 | <1 |
| 388 | 9P36 | ⊥ | C | <100 | <1 |
| 415 | 9P14 | // | C | <100 | 1–5 |
| 696 | 9P34 | ⊥ | C | <100 | 1–5 |

$C_2H_5OH$ (22)

| $\lambda(\mu m)$ | $CO_2$ Line | Pol. | $CO_2$ Source | $W_{in}$ | $mW_{out}$ |
|---|---|---|---|---|---|
| 396 | 9P32 | — | CW | ≦20 | 0.01 |

$C_2H_5Cl$ (23)

| $\lambda(\mu m)$ | $CO_2$ Line | Pol. | $CO_2$ Source | $W_{in}$ | $mW_{out}$ |
|---|---|---|---|---|---|
| 900 | 10R30 | — | CW | ≦40 | 0.1 |
| 1350 | 10R30 | — | CW | ≦40 | 0.01 |
| 1400 | 10R38 | — | CW | ≦40 | — |
| 1720 | 10R28 | — | CW | ≦40 | 0.1 |

$NH_3$ (24)

| $\lambda(\mu m)$ | $CO_2$ Line | Pol. | $CO_2$ Source | $W_{in}$ | $mW_{out}$ |
|---|---|---|---|---|---|
| 34.26 | 10P12 | // | T | <300 K | Med. |
| 35.10 | 10P14 | // | T | <300 K | Med. |
| 36.15 | 9P24 | ⊥ | T | <300 K | Med. |
| 56.86 | 10P20 | — | T | <300 K | Wk. |
| 58.0 | 10R 4 | — | T | 1 M | <20 W |
| 58.03 | 10R 4 | — | T | <300 K | St. |
| 64.70 | 9P24 | // | T | <300 K | St. |
| 67.25 | 9R30 | — | T | <300 K | St. |
| 72.6 | 10R 6 | ⊥ | T | 1 M | <20 W |
| 74.18 | 10R 6 | ⊥ | T | <300 K | St. |
| 83.82 | 9R30 | — | T | <300 K | Wk. |
| 88.90 | 9R30 | // | T | <300 K | St. |
| 90.55 | 9R16 | // | T | <300 K | St. |
| 118.98 | 10R 4 | — | T | <300 K | Wk. |
| 147.04 | 9R30 | — | C | 100–150 | — |
| 147.10 | 9R30 | — | T | <300 K | St. |
| 151 | 10P32 | — | T | 2 M | .4 K |
| 151.81 | 10P32 | ⊥ | T | <300 K | St. |
| 151.9 | 10P32 | — | T | 1 M | <20 W |
| 155.13 | 10R 6 | ⊥ | T | <300 K | Wk. |
| 216.38 | 10P 6 | // | T | <300 K | Med. |
| 225.33 | 10P 4 | // | T | <300 K | Med. |
| 256.67 | 10R14 | ⊥ | T | <300 K | St. |
| 280.5 | 10R 8 | — | T | 1 M | <20 W |
| 281.27 | 10R14 | ⊥ | T | <300 K | Med. |
| 281.40 | 10R 8 | // | T | <300 K | St. |
| 290 | 10P32 | — | T | 2M | .8 K |
| 291 | 10R 6 | — | T | 2M | 80 W |
| 291.2 | 10R 6 | — | T | 1M | <20 W |
| 291.27 | 10P32 | // | T | <300 K | Med. |
| 291.87 | 10R 6 | // | T | <300 K | St. |
| 311.76 | 10R 4 | — | T | <300 D | St. |
| 388 | 9R30 | — | T | <300 K | Wk. |

$O_3$ (25)

| $\lambda(\mu m)$ | $CO_2$ Line | Pol. | $CO_2$ Source | $W_{in}$ | $mW_{out}$ |
|---|---|---|---|---|---|
| 121 | 9P14 | — | C | 100–150 | — |
| 163.61 | 9P40 | — | C | 100–150 | — |
| 171.5 | 9P30 | — | C | 100–150 | — |

$D_2O$ (26)

| $\lambda(\mu m)$ | $CO_2$ Line | Pol. | $CO_2$ Source | $W_{in}$ | $mW_{out}$ |
|---|---|---|---|---|---|
| 50.5 | 9P32 | — | T | 2 M | 2.8 W |
| 66 | 9P32 | — | T | 2 M | 28 K |
| 83 | 9P32 | — | T | 2 M | 12 W |
| 94 | 9R12 | — | T | 2 M | .4 K |
| 114 | 9R12 | — | T | 2 M | .12 K |
| 116 | 9R32 | // | T | 10–20 M | 1 K |
| 119 | 9P32 | // | T | 10–20 M | 1 K |
| 142 | 9R12 | ⊥ | T | 10–20 M | 1 K |
| 263 | 9R34 | // | T | 10–20 M | 1 K |
| 385 | 9R22 | — | T | 2 M | .36 K |
|  |  | ⊥ | T | 10–20 M | 1 K |

Many different experimental techniques have been used for optically-pumped submillimeter lasers and a brief discussion of these techniques is necessary for a complete understanding of the tables. In particular, the operation of the submillimeter laser will depend on the pulse length, exact tuning frequency and intensity of the $CO_2$ pump laser. Four types of $CO_2$ lasers have been employed for optical pumping: true cw, chopped, Q-switched and TEA lasers. Where available, submillimeter (SMM) laser output is given in Table 2 for all four types of $CO_2$ pump lasers. The observed efficiency of conversion from $CO_2$ power to SMM power can vary considerably depending on the $CO_2$ pumping conditions. A good example of this is the difference in efficiency of the 570.5 $\mu m$ line of $CH_3OH$ for cw and TEA $CO_2$ laser pumping, as shown in Table 2. There are many possible explanations for this difference and more information about the $CH_3OH$ molecule is required to understand it. In other instances, extraneous factors may effect the SMM laser efficiency, such as cavity optimization. A very low output may result from the presence of an impurity gas or an isotopic species. The SMM output powers listed in Table 2 do establish useful lower limits on output. In general, the ratio of SMM laser power output to $CO_2$ laser power absorbed is constrained by the quantum limit, which, for the optically pumped laser, is one-half the ratio of the SMM laser frequency to the $CO_2$ laser frequency.

One important difference between cw and TEA $CO_2$ laser pumping is the difference in $CO_2$ laser linewidth. A cw $CO_2$ laser has a tuning range on the order of 20 MHz and must be tuned to within about 10 MHz of a gas absorption line in order to obtain good absorption and, thus SMM laser action. Alternatively, the absorption line of the molecule may be tuned into coincidence with the $CO_2$ laser line by Stark or Zeeman tuning, although this is usually inconvenient and is excluded from the tables. A $CO_2$ TEA laser has a broad linewidth of about 2 GHz and may overlap a gas absorption line which cannot absorb the narrow frequency cw laser line. In addition, at very high $CO_2$ laser intensities, strong absorption will occur on the Lorentzian tail of a molecular absorption line even when the $CO_2$ laser frequency is greatly offset from the molecular gas absorption frequency. This effect has been called "off-resonance" optical pumping. For both of these reasons, some lines observed with TEA laser pumping are not observed with cw laser pumping; as, for example, in $CH_3Cl$. The continued development of high pressure, waveguide cw $CO_2$ lasers and multi-atmosphere, pulsed, continuously tunable $CO_2$ lasers will result in many more coincidences between $CO_2$ laser frequencies and molecular gas absorption lines, with a concomitant increase in the number of SMM laser lines.

For a given $CO_2$ pump line and a molecular gas absorption, there is generally only one SMM laser line. In some cases, however, there are many lines. One origin of multiple lines is cascade transitions in the excited vibrational level or refilling transitions in the ground vibrational level. Another origin of multiple lines is the coincidence of more than one gas absorption line with a given $CO_2$ laser pump transition, resulting in several different emission lines. Because the rotational constants of all the gases in Table 2, with the exception of $CH_3F$ and $NH_3$, are not known to high accuracy, particularly for the excited state, the rotational levels involved in pumping and emission cannot be identified. There are some instances where nearly, but not exactly, equal wavelengths have been reported by others for a given gas and $CO_2$ pump line; these have generally been made into separate entries in Table 2 because of the difficulty in deciding whether the wavelengths are actually different transitions or, if not, which wavelength is more accurate. This may be very confusing, especially if the entries are not adjacent in the table. For example, two different research groups have SMM laser wavelengths in $NH_3$ for the 10R8 line of the $CO_2$ laser, the reported wavelengths being 280.5 $\mu m$ and 281.40 $\mu m$, respectively, as given in Table 2. These are listed as separate entries in Table 2 because it is unclear whether they are the same line or two different lines. This situation is particularly confusing since the two lines are not adjacent entries in Table 2, a 281.27 $\mu m$ line obtained in the 10R14 line of the $CO_2$ laser being interposed between them. It is hoped that future research will clarify these conflicting entries.

Table 2 does not include data with regard to systems of the type shown in FIG. 1 using optical pumping with near-infrared lasers other than $CO_2$; examples of such other lasers are HF lasers that emit a 2.7 micrometers, $N_2O$ lasers that emit at 10.78 micrometers, CO lasers that emit at 5.0 micrometers, and others; these short wavelength pumps can be used in conjunction with $NH_3$ gas in the $N_2O$ pumping system and HF gas in the HF pumping system to provide shorter wavelengths. Pump energy is introduced to the vibrational states to excite the particular gas and relaxation of the excited molecules occur by rotational transition with the emission of the near-infrared photons.

Modifications of the invention herein disclosed will occur to persons skilled in the art and all such modifications are deemed to be within the spirit and the scope of the invention as defined by the appended claims.

What is claimed is:

1. A high-power, pulse-mode far infrared gas laser that comprises, in combination: an elongate chamber containing a large volume of a molecular gas with rotational quantum levels whose energy spacing lies in the far infrared region of the electromagnetic spectrum; a $CO_2$ pump laser positioned to direct its radiation in the form of pulses into the chamber at an acute angle to the axis of the chamber; two plane mirrored surfaces in the chamber positioned to receive the $CO_2$ laser pump beam and to cause the incident $CO_2$ laser pump beam to execute a zig-zag path through the gas with a longitudinal component, the $CO_2$ laser radiation serving to invert the energy levels of said gas, the path of the $CO_2$ laser pump beam within the chamber being one which serves to illuminate the molecular gas substantially uniformly and completely; and a curved rear mirror and a mesh front mirror that act in combination to form a resonant cavity which results in narrow linewidth far infrared laser radiation that emits from the resonant cavity; said zig-zag path serving to provide a relatively long absorption path of length L within the chamber without unduly lengthening the resonant cavity; the length L being related to the gas pressure within the chamber and to the intensity of the $CO_2$ laser to assure that substantially all the molecular gas within the chamber is pumped to saturation, in which the $CO_2$ laser is positioned to direct its radiation into the chamber at one longitudinal end of the resonant cavity and which includes reflector means at the other longitudinal end or far end of the resonant cavity to return the $CO_2$ laser radiation back down the chamber making it possible to illuminate uniformly and to saturation substantially all the gas within said chamber, in two passes.

2. A laser as claimed in claim 1 wherein the system parameters are chosen to provide output radiation in which said narrow linewidth is no greater than 40 MHz at half maximum.

3. A laser as claimed in claim 2 in which said system parameters are chosen to provide output radiation in which said narrow linewidth is no greater than 28 MHz at half maximum.

4. A laser as claimed in claim 2 wherein the system parameters include the length of said resonant cavity and in which said linewidth is narrowed by cavity-length adjustment that suppresses unwanted modes.

5. A laser that comprises, in combination: a chamber containing a molecular fluid, pump means positioned to direct a laser pump beam into the chamber at an acute angle to an axis of the chamber, the chamber having two facing mirrored surfaces operatively disposed to receive said beam and reflect it back and forth between the mirrored surfaces and along a path having a component parallel to said axis such that the beam subjects a substantial portion of the fluid in the chamber to pump beam radiation and effects substantially uniform and complete illumination of the fluid in the chamber, the length of said path being related to the fluid pressure within the chamber to assure that substantially all the fluid within the chamber is pumped to saturation, and mirror means forming a cavity whose length is adapted to provide dominant single-mode operation wherein said chamber is an elongate chamber, in which the pump means is a high intensity laser positioned to direct its radiation into the chamber at one longitudinal end of the resonant cavity and which includes reflector means at the other longitudinal end or far end of the resonant cavity to return the laser radiation back down the chamber in such a way as to illuminate uniformly and to saturate substantially all the fluid within said chamber, in two passes.

6. A laser as claimed in claim 5 wherein said chamber has means to evacuate one fluid therefrom and to receive another fluid and wherein the mirror means is (adapted to effect) facile adjustment of the cavity length to permit lasing with the new fluid.

7. A laser as claimed in claim 5 wherein the system parameters are chosen to provide linewidth output radiation from said cavity which is no greater than 40 MHz at half maximum.

8. A laser as claimed in claim 7 in which said system parameters are chosen to provide output radiation in which said linewidth is no greater than 28 MHz at half maximum.

9. A laser as claimed in claim 7 wherein the system parameters include the length of said resonant cavity and in which said linewidth is narrowed by cavity-length adjustment that suppresses unwanted modes.

* * * * *

UNITED STATES PATENT AND TRADEMARK OFFICE
CERTIFICATE OF CORRECTION

PATENT NO. : 4,330,761
DATED : May 18, 1982
INVENTOR(S) : Daniel R. Cohn, Benjamin Lax and Kenneth J. Button It is certified that error appears in the above-identified patent and that said Letters Patent are hereby corrected as shown below:

In column 1, before line 1, insert the following:

--The Government has rights in this invention pursuant to Contract Number NSF-C-670 awarded by the National Science Foundation.--

Signed and Sealed this

Fourteenth Day of September 1982

[SEAL]

Attest:

Attesting Officer

GERALD J. MOSSINGHOFF

Commissioner of Patents and Trademarks